Patented Dec. 23, 1941

2,267,686

UNITED STATES PATENT OFFICE 2,267,686

MANUFACTURE OF PIPERAZINE

Lucas P. Kyrides, Webster Groves, Mo., assignor to Monsanto Chemical Company, St. Louis, Mo., a corporation of Delaware No Drawing. Application August 8, 1938, Serial No. 223,722

7 Claims. (Cl. 260—268)

The present invention relates to piperazine and has as its object to provide a new and improved method of preparing piperazine. Numerous methods of making piperazine have heretofore been described. One of the earliest methods, which yields small amounts of piperazine, consists in aminating ethylene dibromide or ethylene dichloride in the liquid phase with alcoholic ammonia, which reaction can be represented diagrammatically with ethylene dichloride as follows:

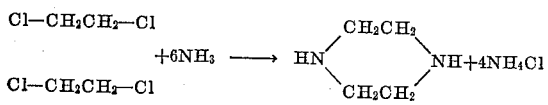

The yields of piperazine are poor. This reaction also yields ethylene diamine, diethylene triamine, triethylene tetramine, and tetraethylene pentamine. The amination of ethylene halides to produce piperazine is difficult to control and is not used for piperazine production. However, the amination of alkylene dihalides is still used industrially, not to produce piperazine, but to produce ethylene diamine, diethylene triamine and other alkylene polyamines, since the reaction is more easily controlled to produce the by-products than to produce piperazine.

I have now discovered that piperazine can be produced in good yields by heating to reaction temperature ethylene diamines or polyethylene polyamines, whereby ammonia is liberated and piperazine ring closure is accomplished as illustrated by the following equations:

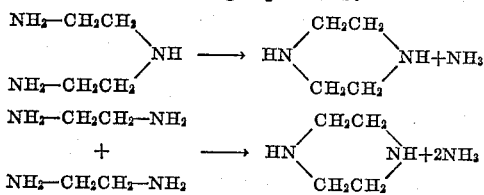

The reaction is facilitated and the temperature thereof lowered substantially by heating the reactant in the presence of a catalyst and preferably, though not necessarily, while in liquid phase. The catalysts which I prefer are the known hydrogenation type catalysts, that is, catalysts which are used to promote hydrogenation reactions. They may be prepared by known methods. The presence of the catalyst accelerates or catalyzes the formation of the desired products. I prefer nickel catalysts, although other catalytic substances may be used, including cobalt, copper, platinum, etc. I have obtained my best results with elemental metallic catalysts; however, the invention is not so limited. Carriers for the metal are not necessary although they may be used if desired as is well understood by those skilled in this art.

Raw materials suitable for my purposes are illustrated by the following: ethylene diamine, diethylamine triamine, triethylene tetramine, tetraethylene pentamine, as well as mixtures such as one obtains when ethylene dichloride is reacted with ammonia to form polyamines. The following examples illustrate the embodiments of my invention.

*Example 1.*—A reduced nickel carbonate catalyst is prepared from precipitated nickel carbonate by reduction at 300° C. with a stream of hydrogen gas. Into an autoclave provided with a stirrer or with other means for agitation are added 250 grams of diethylene triamine of commercial purity and 15 grams of the reduced nickel carbonate catalyst. The stirrer is set in motion or the autoclave is shaken, and the charge is then heated under pressure to 236° C. and maintained at this temperature for 24 hours. The pressure within the autoclave will rise to about 1100 pounds per square inch (about 73 atmospheres). After cooling, the ammonia is released, and the catalyst is separated by filtration or by other suitable methods. For this purpose the mixture may be diluted with a solvent such as methanol, if desired, to facilitate the filtration. The solution, freed from catalyst, is distilled, preferably under partial vacuum but not under high vacuum, since the melting point of piperazine is approximately 104° C., and its boiling point at atmospheric pressure is about 146° C. The piperazine thus recovered can be purified by known methods. The yield of piperazine in this particular case amounts to about 50% of the theoretical. Instead of using vacuum distillation for the recovery of the piperazine, steam distillation may be used.

*Example 2.*—An autoclave is charged with 250 grams of a 70% aqueous ethylene diamine solution and 12.5 grams of reduced nickel carbonate catalyst, after which this is heated as in Example 1 for 18 hours at 235° C. The pressure developed is about 1,200 pounds per square inch (about 80 atmospheres). The piperazine is recovered as in Example 1.

*Example 3.*—Substitute anhydrous ethylene diamine for the aqueous solution of Example 2 and proceed otherwise as therein described.

*Example 4.*—Substitute cobalt or copper hydrogenation catalysts for the nickel in the foregoing examples and proceed as otherwise described.

In general, the preferred temperature for heating the charge is within the range of 200° to 300° C. and is dependent to some extent upon the particular ethylene or polyethylene polyamine selected as the raw material and the period of heating. The reaction may be conducted in an atmosphere of hydrogen or ammonia gas if desired. The foregoing examples are typical methods of practicing the invention but are illustrative rather than limitative. It is to be understood that substitutions of catalysts and starting materials and variations in periods of heating and conditions of reaction may be made in the procedures as hereinbefore set forth without departing substantially from the invention, whose scope is to be limited only by the appended claims.

What I claim is:

1. The method of producing piperazine which comprises subjecting a material selected from the group consisting of ethylene diamine, polyethylene polyamines and mixtures thereof to reaction temperature in the presence of a metal hydrogenation catalyst whereby ammonia is liberated.

2. The method of producing piperazine which comprises subjecting a material selected from the group consisting of ethylene diamine, polyethylene polyamines and mixtures thereof to reaction temperature under liquid phase reaction conditions in the presence of a hydrogenation catalyst that is in metal form.

3. The method as defined in claim 1 and further characterized in that the hydrogenation catalyst has as a component a metal selected from the group consisting of copper, nickel, cobalt and platinum.

4. The method as defined in claim 1 and further characterized in that the hydrogenation catalyst is metallic nickel.

5. The method of producing piperazine which comprises subjecting diethylene triamine under pressure and in the presence of a reduced nickel catalyst to a temperature within the range of approximately 200° to 300° C.

6. The method of producing piperazine which comprises subjecting diethylene triamine under pressure and in the presence of a reduced nickel catalyst to a temperature of approximately 236° C.

7. The method of producing piperazine which comprises subjecting ethylene diamine under pressure and in the presence of a reduced nickel catalyst to a temperature of approximately 235° C.

LUCAS P. KYRIDES.

CERTIFICATE OF CORRECTION.

Patent No. 2,267,686.  December 23, 1941.

LUCAS P. KYRIDES.

It is hereby certified that error appears in the printed specification of the above numbered patent requiring correction as follows: Page 1, second column, line 7, for "ethylamine" read --ethylene--; and that the said Letters Patent should be read with this correction therein that the same may conform to the record of the case in the Patent Office.

Signed and sealed this 17th day of February, A. D. 1942.

(Seal)

Henry Van Arsdale,
Acting Commissioner of Patents.